May 28, 1946.   W. H. FARR ET AL   2,401,235
HEAT TRANSFER MEANS
Filed Nov. 17, 1943   2 Sheets-Sheet 1
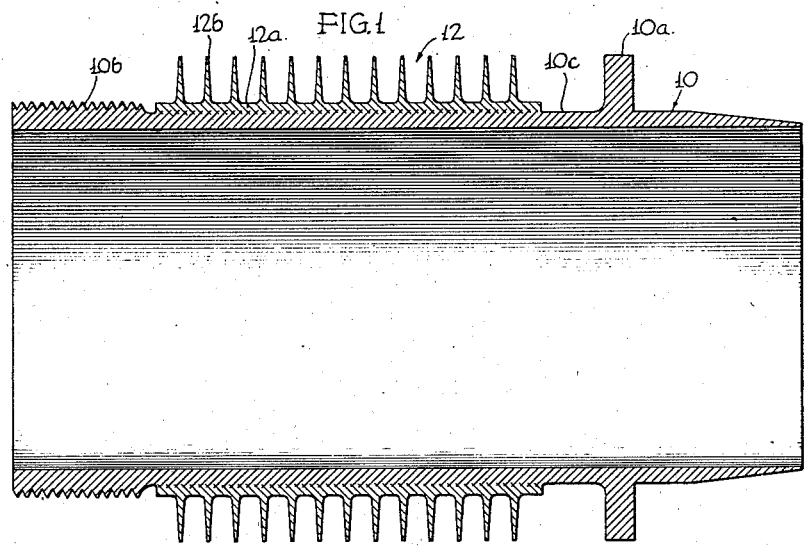
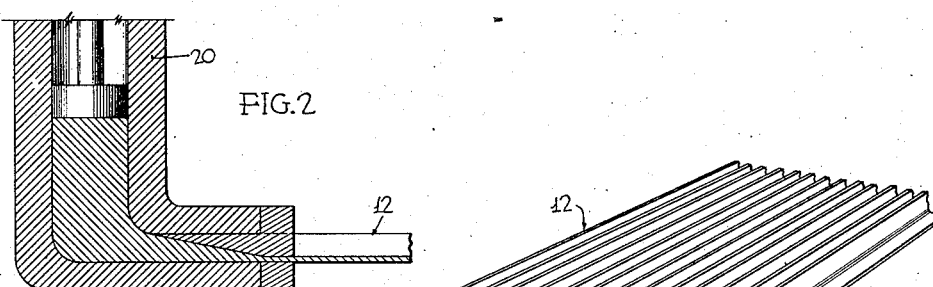
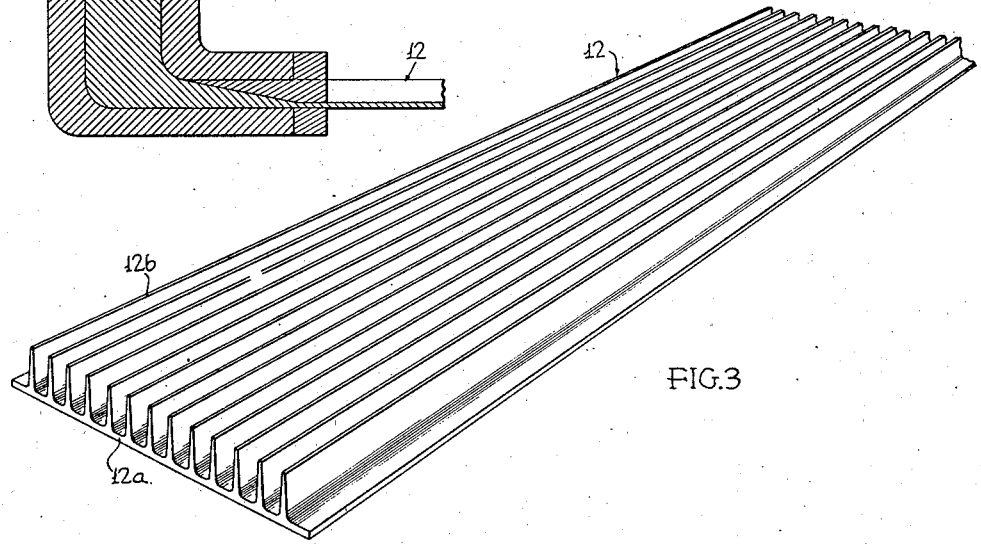
INVENTORS.
Warren H. Farr.
John P. Tarbox
BY
ATTORNEY May 28, 1946. W. H. FARR ET AL 2,401,235
HEAT TRANSFER MEANS
Filed Nov. 17, 1943 2 Sheets-Sheet 2
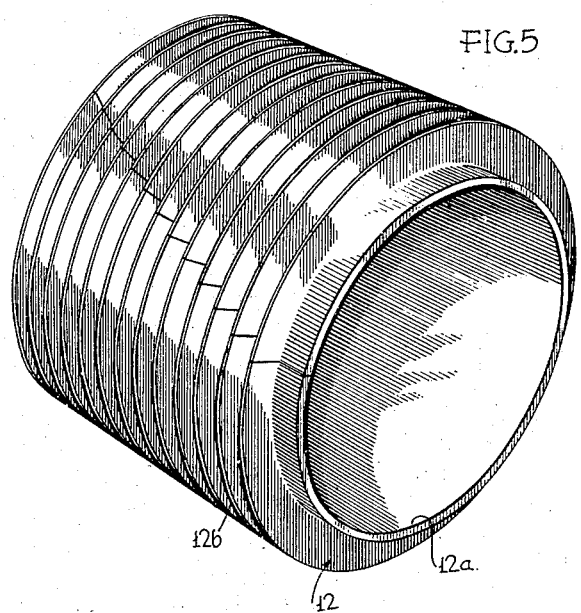
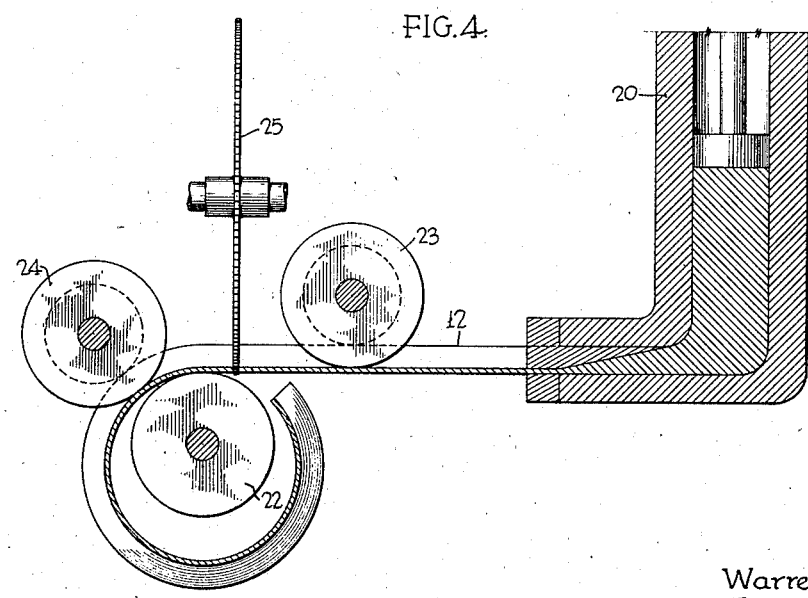
INVENTORS.
Warren H. Farr.
John P. Tarbox.
BY
ATTORNEY Patented May 28, 1946

2,401,235

UNITED STATES PATENT OFFICE 2,401,235

HEAT TRANSFER MEANS

Warren H. Farr, Detroit, Mich., and John P. Tarbox, Philadelphia, Pa., assignors to Budd Wheel Company, Philadelphia, Pa., a corporation of Pennsylvania Application November 17, 1943, Serial No. 510,600

1 Claim. (Cl. 257—261)

This invention relates to heat transfer means such as cylinder fin structure and the like, and has for an object the provision of improvements in this art.

Cylinders of internal combustion engines, compressors, and the like often require cooling fins. The fins may be cast integrally, but since the cylinder is usually of a strong metal like steel which is not the best heat conductor, the fins do not exchange heat as rapidly as desired. It is common to form threads on the outer surface of a cylinder sleeve to secure a cylinder head. The threads are raised to keep the walls thin, uniform and strong and the lower end of the sleeve is provided with a base anchorage flange. Thus the cylinder sleeve has a circumferential groove between the flange and threads where the fins are to be located.

The objects and advantages of the invention will be apparent from the following description of an exemplary embodiment, reference being made to the accompanying drawings, wherein:

Figure 1 is an axial section of a finned cylinder construction according to the present invention;

Figure 2 is a vertical section of apparatus for forming a finned strip;

Figure 3 is a perspective view of the finned strip;

Figure 4 is a vertical section of apparatus for forming a cylindrical finned band; and Fig. 5 is a perspective view of a cylindrical finned band thus formed.

Referring to Figure 1, a cylinder sleeve 10 is provided with an anchorage flange 10a and raised threads 10b forming between them a circumferential groove 10c in which a finned band or muff 12 is secured in effective heat exchange relationship. A homogeneous bond between the cylinder and the smooth inner side of the base web 12a which carries the cooling fins or ribs 12b may be provided by brazing, soldering, welding or otherwise suitably connecting the surfaces by known means, electromagnetic inductive heating of the soldering or brazing material being at present preferred. The band is formed of good heat conducting material, such as copper, aluminum, silver, and the like and their alloys. In a thin-finned structure, the band is very light, particularly if made of aluminum, and as herein formed has clean, smooth, external surfaces which provide smooth flow of cooling fluid and very effective heat exchange.

The metals preferred for forming the band are soft and may be extruded, as by a press 20 Figure 2, into a rectilinear strip. The strip in that form with its base web 12a and fins 12b is shown separately in Figure 3. The strip is bent transversely to cause the fins to be disposed circumferentially as shown in Figure 1. During bending the fins will be supported to prevent buckling. This bending works the fins to some extent to strengthen them.

The strip is cut to length to form a band which fits the cylinder with the ends practically abutting each other. The ends may be secured together by welding if the metal is suitable; or by brazing or soldering, if not; or may be left abutting or close together and unbonded, if the base web is suitably bonded to the cylinder. As shown in Figure 5, the ends are preferably cut obliquely across the fins.

The strip may be cut from a sheet of stock and then bent; or it may be bent as it is extruded, as by rolling it over a mandrel 22, Figure 4, which may be the cylinder itself suitably supported interiorly, in association with forming rolls 23 and 24. The strip is cut by a saw 25 either passing squarely or obliquely across the strip.

Another method of getting a tight band in the cylinder groove is to bond the ends of a curved finned strip together, then expand the band and shrink it on the cylinder by cooling. Or it may be squeezed on by radial dies in known manner, the cylinder sleeve preferably being supported by a solid mandrel so it will not be deformed or stressed beyond the elastic limit.

The muff is shrunk beyond its elastic limit but not near its breaking point in this operation, the height of the threaded enlargement being such as to provide deformation within this range. The muff consequently maintains its new size without appreciable springback.

While one embodiment of the invention has been described for the purposes of illustration, it is to be understood that there may be various embodiments within the limits of the prior art and the scope of the subjoined claim.

What is claimed is:

A cylinder muff composed of a metal having a high heat conducting capacity composed of a circular strip of a width substantially the same as the axial cylinder length to be occupied by the muff, the strip comprising a base web having a smooth surface on the inside and circumferential fins on the outside, the ends of the fins abutting each other but circumferentially offset from the adjacent fin ends whereby heat exchange reduction due to fin discontinuity along a line through a fin junction parallel to the muff axis is reduced to a minimum.

WARREN H. FARR.
JOHN P. TARBOX.